J. B. H. Chatain,
Wood Molding Machine.
No. 7,181.          Patented Mar. 19, 1850.
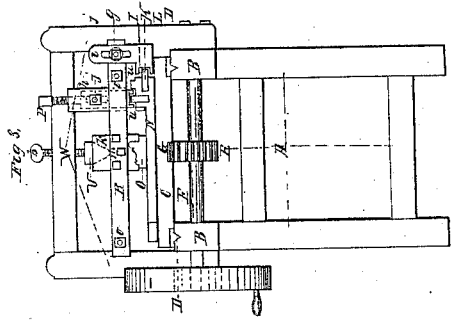
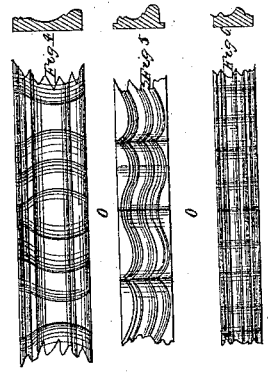
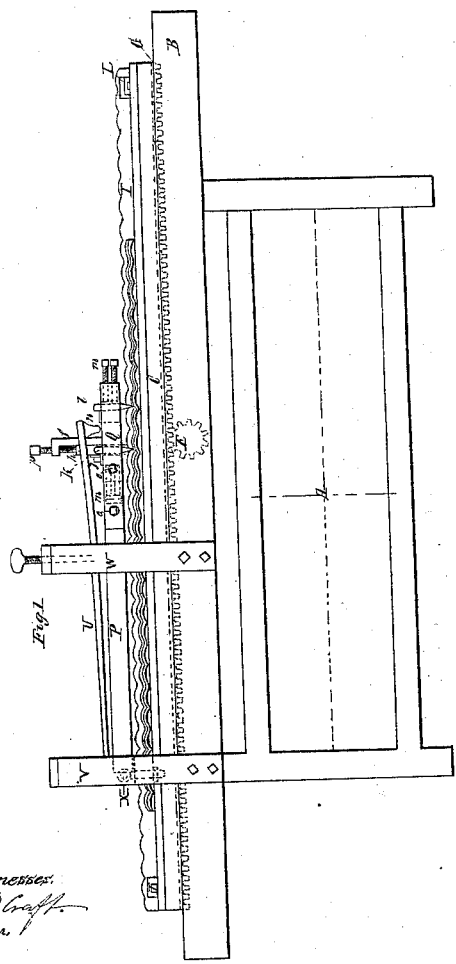
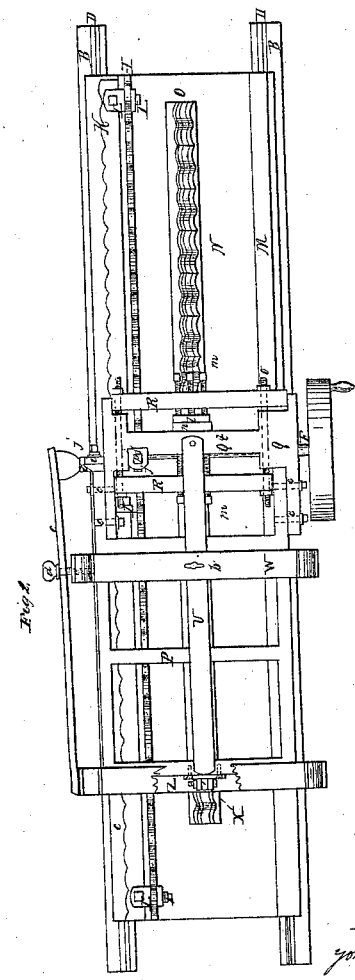
Witnesses:
W. D. Craft
C. J. Farr
Inventor.
John B. H. Chatain

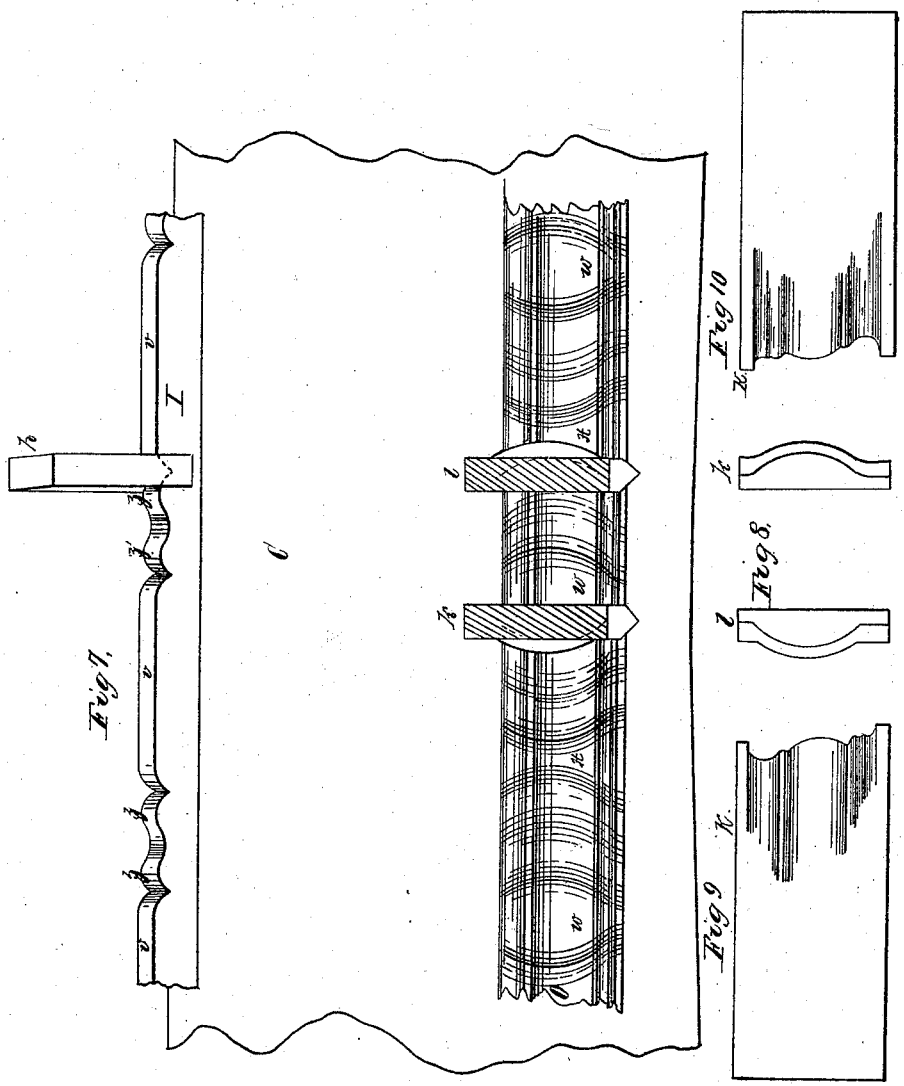

UNITED STATES PATENT OFFICE.

JOHN B. H. CHATAIN, OF NEW YORK, N. Y.

MACHINE FOR PLANING ORNAMENTAL MOLDINGS.

Specification of Letters Patent No. 7,181, dated March 19, 1850.

*To all whom it may concern:*

Be it known that I, JOHN B. H. CHATAIN, of the city, county, and State of New York, have invented a new and useful improvement on a machine which has been many years in use both in France and other parts of Europe for making moldings in partial imitation of carving; and I do hereby declare that the following is a full, clear, and exact description of the construction and operation of my said improvements as made on and in connection with said above mentioned machine, which in order to enable others skilled in the art to make and use to advantage I shall describe together as one machine and then point out what I claim as new in contradistinction to the old parts thereof, reference being had to the annexed drawings, making a part of this specification, in which—

Figure 1, is a longitudinal elevation. Fig. 2, a surface or birdseye view, and Fig. 3, a transverse elevation, of said machine. Figs. 4, 5, 6, are face and transverse section views of moldings produced by the same. Fig. 7, a partial perspective side elevation and surface view of a section of the carriage C, supporting the gage I, guide $h$, compound scrapers, $k$, $l$, and compound molding O. Fig. 8, the end edgeviews of said scrapers. Fig. 9, a concave, and Fig. 10, a convex face view of the same as hereinafter set forth and described, the same parts being indicated by similar letters of reference throughout.

A, is the base, or supporting frame of the whole machine. B, the upper side rails of the same, upon which the carriage C, is arranged to traverse, horizontally lengthwise guided by Vs fitted into the grooves D, which are cut longitudinally in the upper surface of B. Said carriage C, is propelled by means of the pinion E, upon the shaft F, which pinion goes into the rack G, which is affixed lengthwise to the under surface of the central rail of the carriage C. Upon one of the side rails of C, is secured the gages I, K, which are made of flat metal bars one being placed upon its edge, and the other upon its face, and secured to C, by means of chucks or flanges L. The projecting edge of these bars, are cut into teeth or figured projections, which are formed with a view to produce the desired figure of molding to be wrought. Lengthwise upon the opposite side rail of G, is fixed a cleat, or stop M, between, which and the gage I, is left a space, into which is fitted the forming board N, upon which, the slab for the molding O, is partially glued or otherwise secured for being wrought.

P, is a swivel carriage, which is suspended horizontally over the carriage C, within two gallows frames V, W, which frames stride over, and are bolted to B. The rear end of the carriage P, is supported by means of a swivel joint X, connecting it to a horizontal cross rail Z, in the frame V, and its front end, upon the gages I, K, by means of the guides $h$, $i$. This front portion of P, I term the tool frame Q, which is made to be detached at pleasure by means of the fastening bolts $e$, $e$.

R, R, are two clamps, placed one on each side of the cross bar Q, $t$, and secured by two graduating bolts $o$, $o$, which pass horizontally through the end of R, R, and Q, $t$, and provided with set nuts at their outer ends, by means of which in combination with the adjusting block $n$, the scrapers $k$, $l$, may be placed any requisite distance apart and secured by the two gangs of set screws $m$, three of which pass through each clamp and set against the side of said scrapers, which rest against the side of the cross bar Q, $t$, as before stated.

The edge line of the said scrapers are formed on two different plans, which I distinguish as plain, and compound. In the plain kind, the molding figure is cut upon a flat steel plate, similar to the blade of a wood turner's chisel, which is beveled alike on both sides. In order to form the compound scrapers a portion of the bottom ends of said plates, or plain scrapers, is bent, or swedged longitudinally and reverse to each other, into such curves, or angles, as may be requisite to produce the transverse figures preferred. These scrapers are secured in the tool frame in the same manner as the plain scrapers in Fig. 1, where only one scraper is required to perform plain work, although the two may be used provided that they track alike, or work into the same figures, as here represented. This however is not the case with the said compound scrapers, which are set with these curves reverse to each other as shown in Fig. 7, where all of the parts exhibited are drawn on a full scale, and relatively located precisely as in the machine, when in operation.

It will here be observed that the figures $w$ and $x$, formed upon the molding O, are not indicated upon the gage I, they being a combination of the reverse curves produced by the reverse action of the two scrapers each of which, by means of the blank spaces $v$, on said gage, passes quite over the work done by the other and begins to take effect, (as the carriage reciprocates,) the reverse way from where the other began, in the previous counter motion of the carriage, consequently the right hand lines of $x$ and $w$, are formed by the scrapers $k$ and $l$, as they are let down by the guide $h$, as it descends from the blank spaces $v$, into the first notch between it and $z$, and as the carriage moves to the left the projections $z$, cause each of the scrapers to form two semicircular figures on said molding, between $w$ and $x$, and as the scrapers are raising to pass over the next space $v$, on said gage, $k$, forms the left hand side of the Figs. $x$ and $l$, the same side of the Fig. $w$, and so on to the end as the carriage returns, each scraper performs its work back over the same surface, in which, as before stated the scraper $k$, forms the left hand side of the figure $w$ and the right hand side of the figure $x$, while the scraper $l$, forms the right hand side of Fig. $w$, and left hand side of Fig. $x$.

To one end of the cross bar Q, $t$, is firmly fixed the guide holder $f$, (see Fig. 1 and 2) made in the form of a standard, with a vertical set screw, descending through a horizontal flange, or portion of its upper end. The guide holder $g$, is a horizontal projecting flange, nearly opposite to $f$, on the outside of Q. In these two holders are set the guides $h$, $i$, which are adjusted by the screw bolts $j$, $j$, which pass through slots in said guides, into the said holders. The guides $h$, $i$, are straight flat bars, the latter being bent at its lower end at a right angle, in order to bear against the edge of the gage K. The impinging ends of both guides are obtusely wedge shaped in order to fit into the figures of the gages upon which they are held or supported sidewise by means of projecting guards, $u$, at their lower outer corners. Lengthwise over the swivel frame P, is placed the lever spring, U, with its rear end resting on P, near X, and its front end on the cross bar Q, $t$, upon which its pressure is regulated by the screw $b$, which passes vertically through the cap of W, and bears upon said spring near its center.

The side lever spring $c$, is placed horizontally outside of the frames V, W, opposite to P, with its rear end bearing against the post of V, and its front against a flange on the side of Q, against which its pressure is regulated by the screw $d$, which passes through near its center into the post of W. The office of the spring U, and $c$, is to keep the requisite downward and horizontal pressure upon the frame Q, while in operation.

Having described the general structure and arrangement of said machine, which combines my improvement with the old plan, I will now briefly point out what I conceive to be some of the important peculiarities in contradistinction to all processes of planing, whether executed by hand or machinery, and also to the old machine for making moldings and the limited style of work thereby produced. In the first place, the instrument directly employed in performing the work in my machine, is brought to an edge, by being beveled alike on both sides, and is placed and operated in a vertical position to the line of motion, and consequently reduces the opposing surface, by a scraping process only. On the contrary, all plane irons are beveled only on one side, and are placed and operated at an angle of about 45 degrees with the line of motion, and consequently operate exclusively as cutters.

The scraper in my machine forms the minutest and most perfect figures, boldly projected, and divided by transverse interstices terminating in the most delicate and acute angles, while the plane, whether operated by hand or machinery, is only adapted to the reducing of straight surfaces, or at most to extended and easy curves such for instance as oar blades, barrel staves &c.

I will now point out the parts that are old, in said machine, and the new parts which I claim as my improvements thereon, with their relative capacities for the purposes designed. The productions of the old machine, were confined to moldings wrought with figures which were similar in their general forms, and varying only in their longitudinal, span, curves, and projections, a sample of which is shown in Fig. 6. The restricted powers of this machine, resulting in a limited range and sameness in the style of work produced, was the inevitable consequence of its deficiency in the transverse horizontal motion of the carriage P, and the extra scraper it being constructed to operate with only one gage, and one scraper which produces only the one vertical motion of the said carriage and similar figures the whole molding throughout see Fig. 6. In my improved arrangement I have introduced the extra scraper K, Fig. 7, by which I produce moldings wrought with a variety of different formed figures, on the same piece see Figs. 4, and 7, O. The next feature in my said improvement consists in producing the transverse motion of the carriage P, by the introduction of the side, or extra gage K, and the substitution of the universal joint X for the common hinge joint as before constructed.

By this last improvement, I am enabled to execute any style of ornamental waved molding, with greater facility and accuracy of design, and also with a greater perfection and beauty of finish, than can possibly be done by hand or any other process that I have ever known.

Fig. 5, is a plain sample of said double waved molding, executed by this last mentioned arrangement with one scraper and two gages, which is shown in Fig. 2 as before mentioned.

Said machine operates as follows.—The slab designed for the molding being fixed upon the forming board N, which is placed upon the carriage C. The swivel carriage P, having been partially raised for the purpose, is now let down which bring the scraper or scrapers, to the work, and the guide or guides $h$, $i$, upon their respective gage or gages. The machine is now set in motion by hand or otherwise through the agency of the shaft F, pinion E, and rack G. The guide or guides $h$, $i$, as they pass over the gage or gages, I, K, receive the resulting motion or motions which are conveyed from them to the carriage P, and from it to the scraper or scrapers $k$, $l$, which being forced downward and horizontally upon the slab by the springs U, and $c$, progressively delineate, and work out, upon its face or faces, such figures and forms as must necessarily result from the relative position, forms, and combined action, or influences of said gage or gages upon the guide or guides &c. and as the carriage C, reciprocates back and forth the said scraper or scrapers continue settling as the work progresses until the guide or guides $h$, $i$, reach the bottom of the figures upon their respective gage or gages, which prevents the scraper or scrapers from taking further effect upon the work, and consequently completes the operation.

I do not claim to have invented or improved upon any plan of a plaining machine whatever. Neither do I claim to be the inventor of any plan of a machine for forming ornamental moldings by a scraping process in which only one gage, and one scraper are used in combination with a tool frame, or carriage which has only a vertical motion. But What I do claim and desire to secure by Letters Patents, is—

1. The method of using two scrapers, one in advance of the other, in combination with a single gage.

2. I also claim the method of using the universal joint, in combination with the swivel carriage and two gages, the same being constructed arranged and operated essentially, as above set forth and described.

JOHN B. H. CHATAIN.

Witnesses:
 W. D. CRAFT,
 E. T. FARR.